Jan. 22, 1957  D. M. LIGHT  2,778,457
FABRICATED BRAKE BEAM
Filed Dec. 15, 1951  6 Sheets-Sheet 1

INVENTOR.
David M. Light
BY O. B. Garner
Atty

Jan. 22, 1957  D. M. LIGHT  2,778,457
FABRICATED BRAKE BEAM
Filed Dec. 15, 1951  6 Sheets-Sheet 2
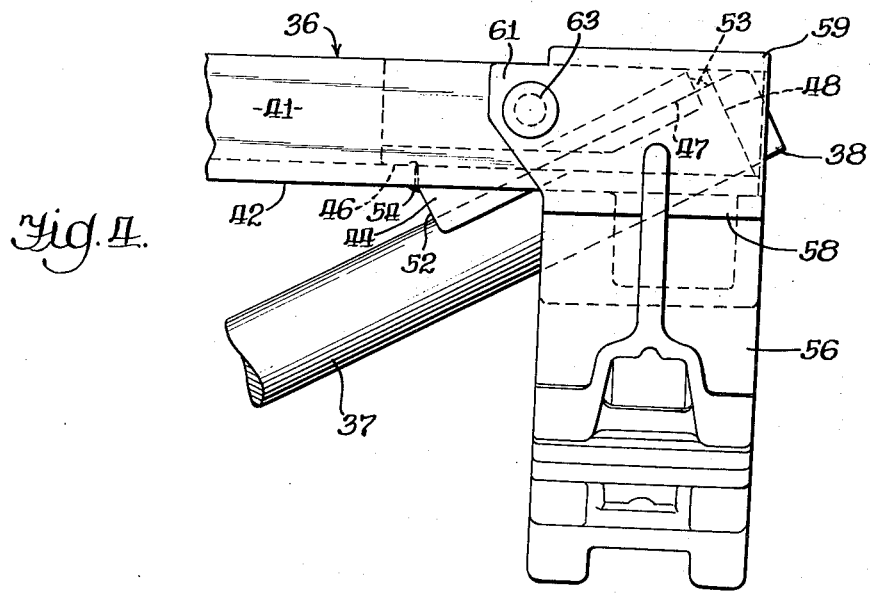
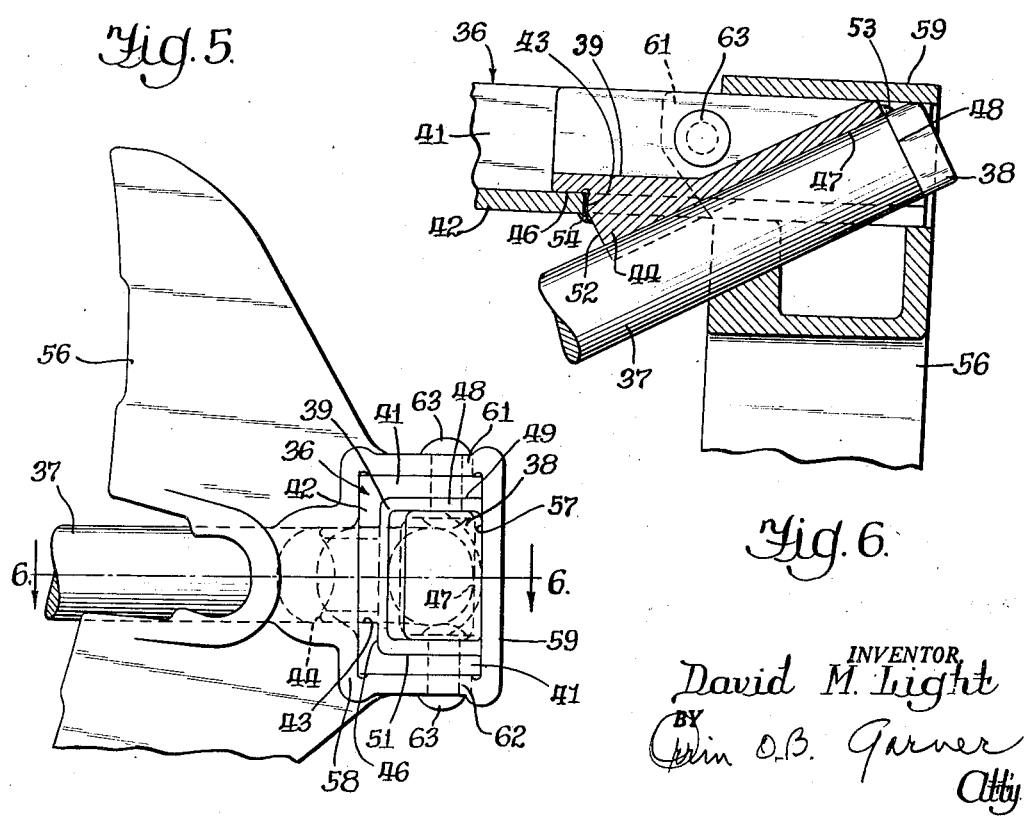

Jan. 22, 1957   D. M. LIGHT   2,778,457
FABRICATED BRAKE BEAM
Filed Dec. 15, 1951   6 Sheets-Sheet 3
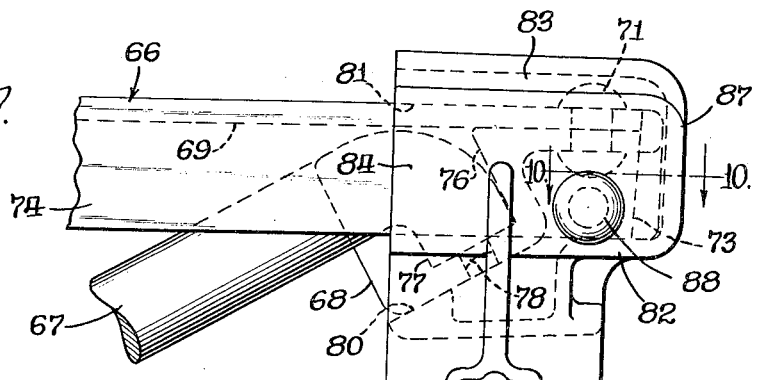
Fig. 7.
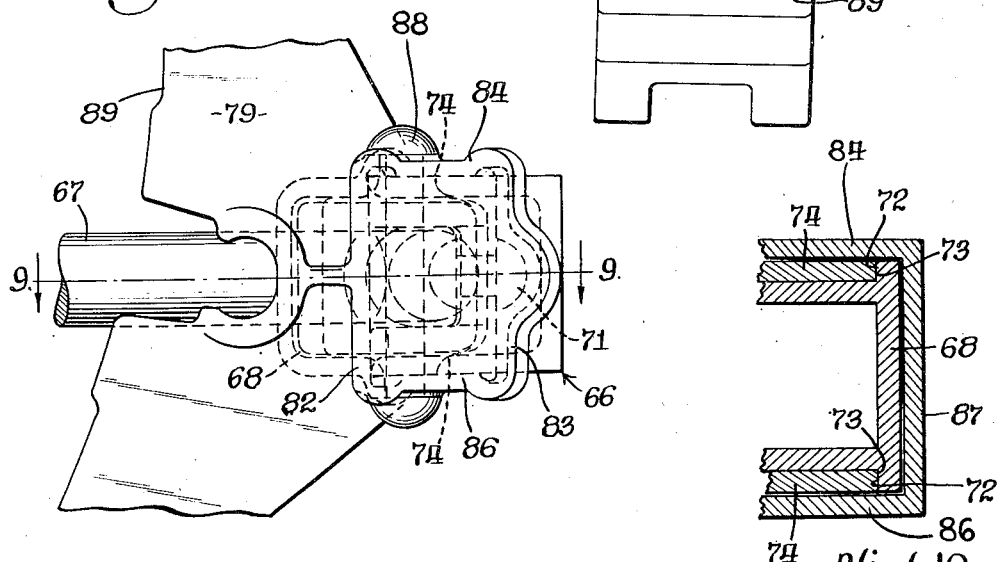
Fig. 8.
Fig. 10.
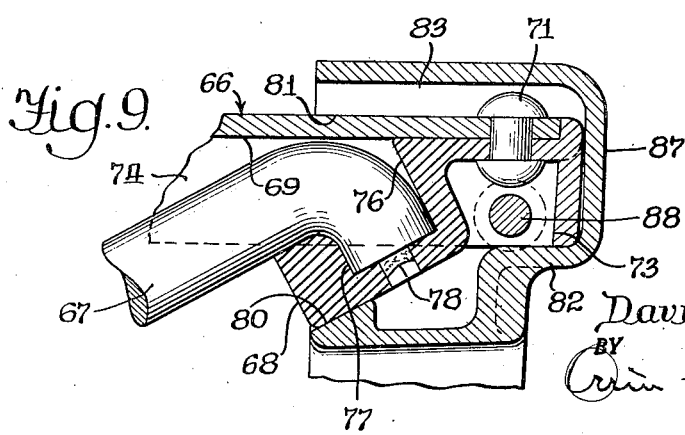
Fig. 9.
INVENTOR.
David M. Light
BY
Atty

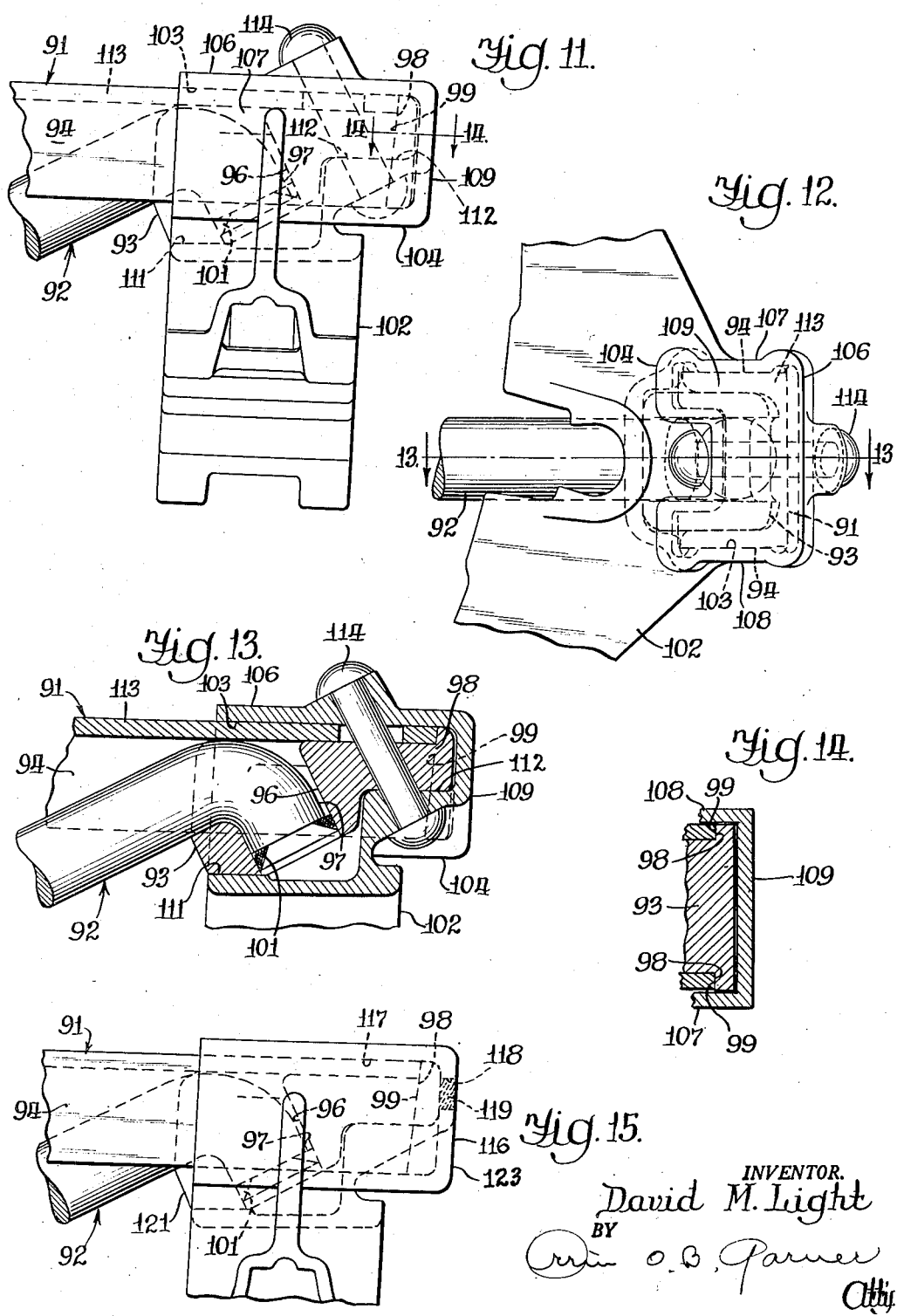

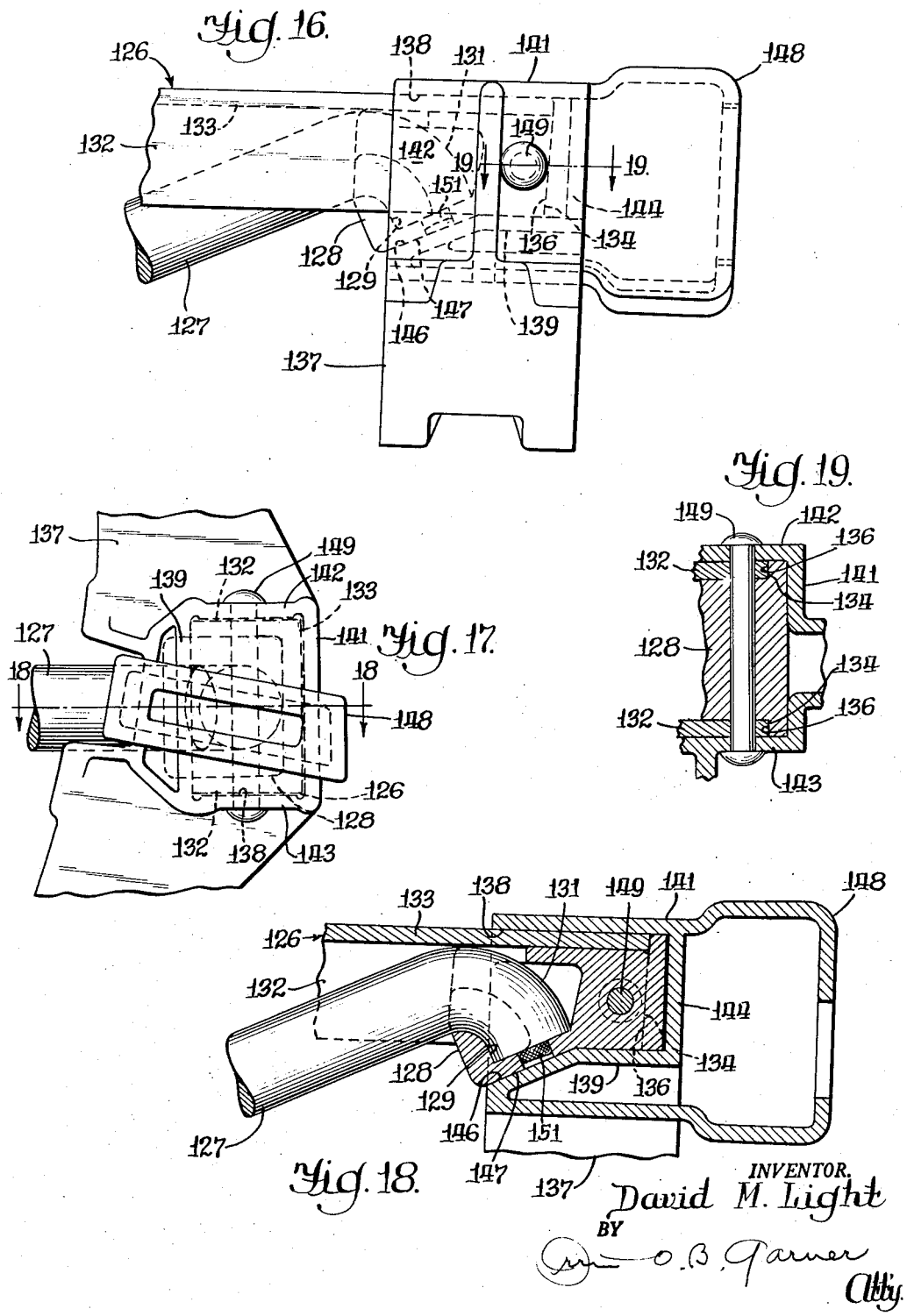

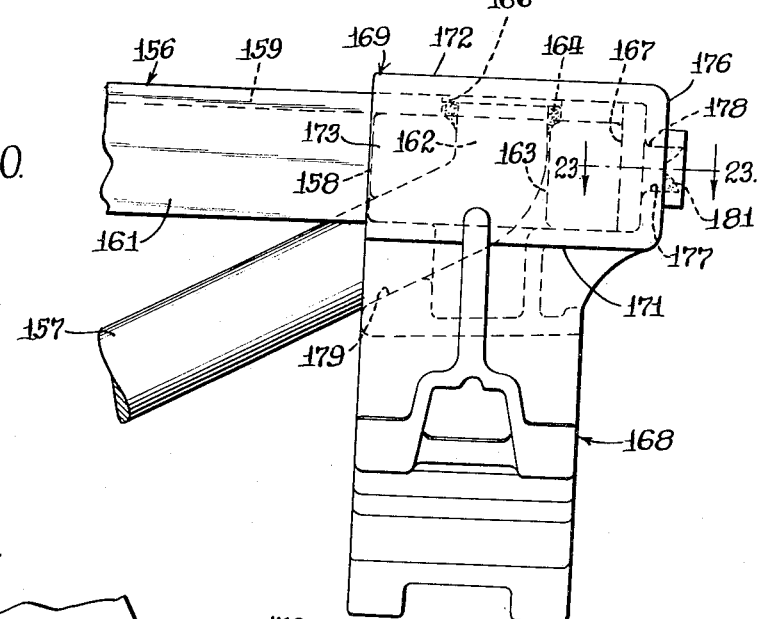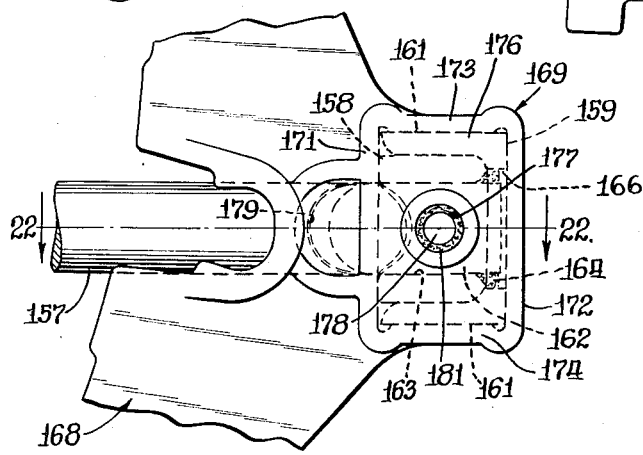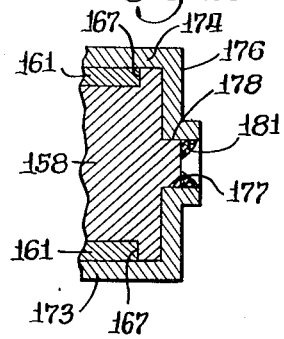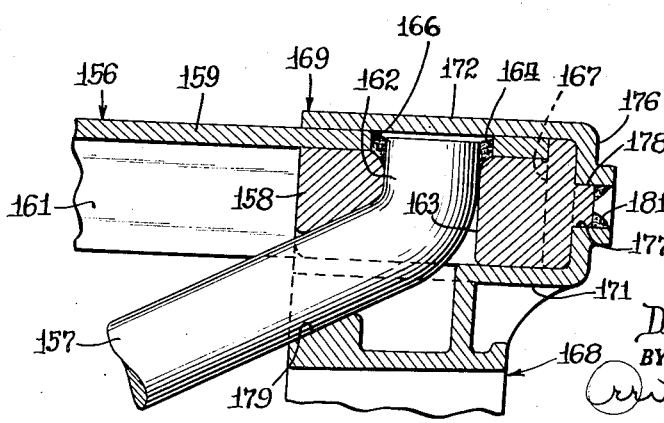

United States Patent Office 2,778,457
Patented Jan. 22, 1957

2,778,457

FABRICATED BRAKE BEAM

David M. Light, Chicago, Ill., assignor to American Steel Foundries, Chicago, Ill., a corporation of New Jersey Application December 15, 1951, Serial No. 261,893

8 Claims. (Cl. 188—223.1)

This invention relates to fabricated truss type brake beams adapted for use in the brake rigging of a railway car truck and contemplates the provision of a relatively light weight structure capable of withstanding the severe stresses of railway service.

Briefly, the present invention contemplates the provision of a truss type brake beam comprising a compression member, a tension member, a strut interposed between the medial portions of said members, adapters interconnecting adjacent ends of said members, and a brake head mounted on each end of the beam and formed to receive conventional brake shoes.

This invention further contemplates the provision of a truss type brake beam which is complete in itself, independently of the brake heads, to permit the removal and replacement of worn or broken heads without disturbing the parts of the beam, the heads being removably secured to the ends of the beam by suitable fasteners such as rivets.

This invention further contemplates the provision of a fabricated truss type brake beam in which the adapters are formed with wedge surfaces acting, during assembly of the beam, to exert the necessary tension on the tension member and the necessary thrust and camber on the compression member, the ends of said members being welded to the adjacent adapter to provide a rigid integral structure to meet the requirements of railways and railway associations.

This invention further contemplates the provision of brake heads formed with sockets to snugly receive the ends of the brake beam, the sockets serving to center the heads in proper position relative to the length of the beam and to lock the heads against movement around the beam. To suit the requirements of different railways, the heads may be formed with guide portions for reception within conventional guide brackets of an associated railway truck, or formed with sockets to receive conventional hangers.

This invention further contemplates the provision of a brake beam structure in which the adapters are formed with sockets to snugly receive offset end portions of the tension member, the end portions being welded to their associated adapters and disposed substantially perpendicular to the adjacent portions of the tension member.

This invention embodies other novel features, details of construction and arrangement of parts which are hereinafter set forth in the specification and claims and illustrated in the accompanying drawings forming part thereof, wherein:

Figure 4 is a fragmentary top plan view illustrating a modified form of this invention, only one end of the brake beam structure being shown.

Figure 5 is an end view of same.

Figure 6 is a longitudinal sectional view taken along the line 6—6 of Figure 5.

Figure 7 is a fragmentary top plan view illustrating another modified form of this invention, only one end of the brake beam structure being illustrated.

Figure 8 is an end elevational view of same.

Figure 9 is a longitudinal sectional view taken along the line 9—9 of Figure 8.

Figure 10 is a fragmentary detail sectional view taken along the line 10—10 of Figure 7.

Figure 11 is a fragmentary top plan view illustrating another modified form of this invention, only one end of the brake beam structure being illustrated.

Figure 12 is an end elevational view of same.

Figure 13 is a sectional view taken along the line 13—13 of Figure 12.

Figure 14 is a detail sectional view taken along the line 14—14 of Figure 11.

Figure 15 is a top plan view illustrating another modified form of this invention, only one end of the brake beam structure being shown.

Figure 16 is a fragmentary top plan view illustrating another modified form of the invention, only one end of the brake beam structure being illustrated.

Figure 17 is an end elevational view of same.

Figure 18 is a longitudinal sectional view taken along the line 18—18 of Figure 17.

Figure 19 is a detail sectional view taken along the line 19—19 of Figure 16.

Figure 20 is a top plan view illustrating another modified form of the present invention, only one end of the brake beam structure being shown.

Figure 21 is an end elevational view of same.

Figure 22 is a longitudinal sectional view taken along the line 22—22 of Figure 21.

Figure 23 is a detail sectional view taken along the line 23—23 of Figure 20.

Figure 1:
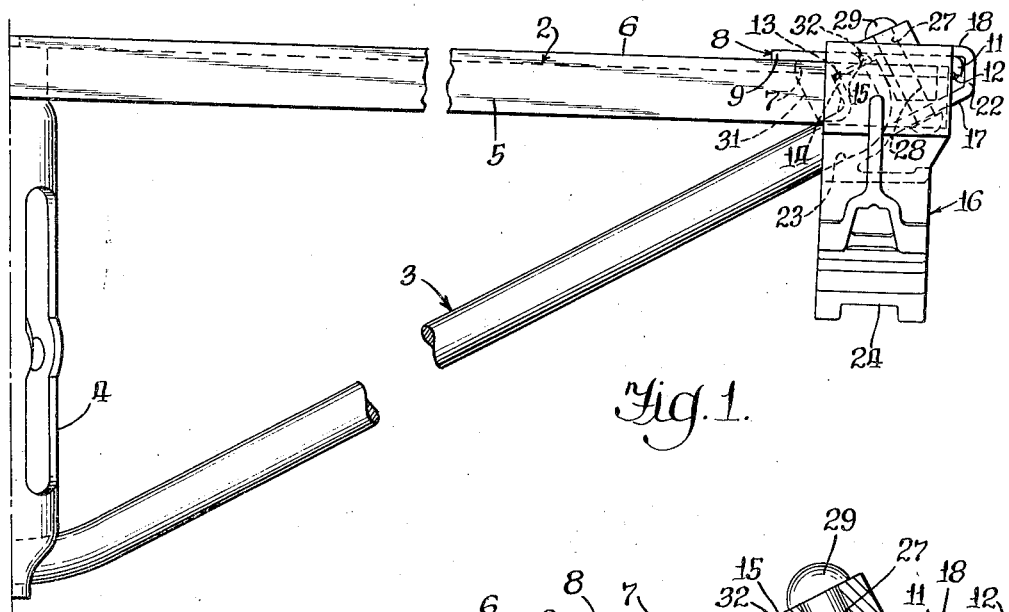
Figure 1 is a fragmentary top plan view illustrating one end of brake beam embodying features of the present invention.
Figure 3:
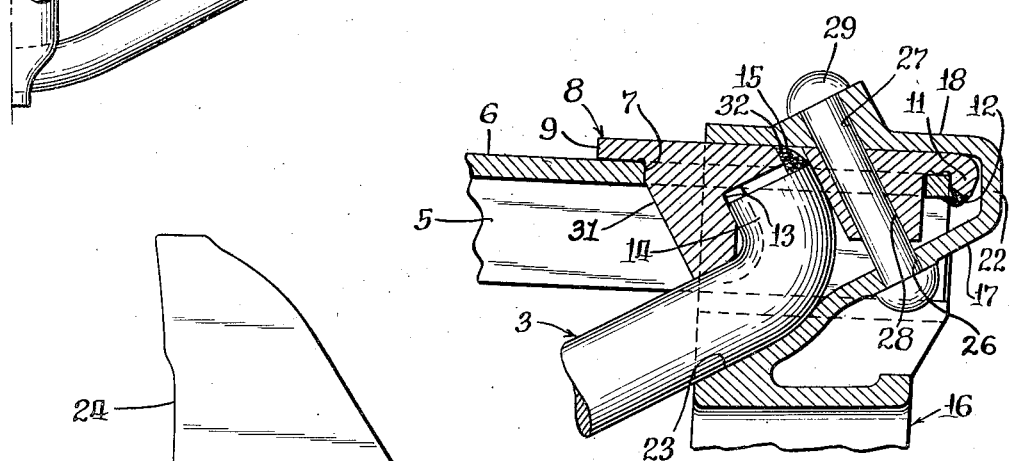
Figure 3 is a sectional view taken along the line 3—3 of Figure 2.
Figure 2:
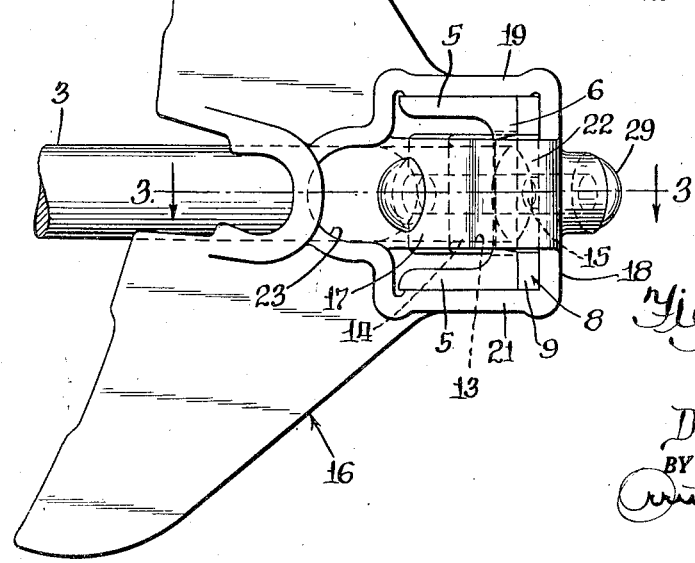
Figure 2 is an end view of same.

Referring now to the drawings for a better understanding of the present invention and more particularly to Figures 1 to 3 therein, the truss type brake beam is shown as comprising a compression member 2, a tension member 3 having its ends secured to the ends of the compression member, and a central strut 4 interposed between the medial portions of said members. As opposite ends of the brake beam are similar in construction, only one end of the beam has been shown.

The compression member 2 is channel-shape in cross section to provide a pair of spaced flanges 5—5 and a connecting web 6, each end of the web being formed with an elongated slot 7 to receive an adapter 8. The adapter is formed with a marginal flange 9 having an inturned lip 11 disposed to overlie the adjacent end of the web 6 and to be welded thereto at 12. The front face of the adapter is formed with a recess 13 to snugly receive the adjacent offset end 14 of the tension member 3 which is preferably formed of round rod stock. As illustrated in the drawings the end 14 is substantially perpendicular to the adjacent portion of the tension member and projects rearwardly and inwardly along a diagonal plane for welded engagement at 15 to the adapter. The brake beam thus formed provides a rigid integral structure adapted to support a pair of brake heads 16 detachably mounted on the ends thereof.

Each brake head 16 is formed with a socket defined by a front wall 17, rear wall 18 and spaced parallel top and bottom walls 19 and 21, respectively, to snugly embrace the adjacent ends of the compression and tension members and the adapter 8, the outboard ends of the front wall and rear wall being joined together by an end wall 22. It will be noted that remote faces of the flanges 5—5 and side edges of the adapter flange 9 are in flush engagement with the inner surfaces of the top and bottom walls 19 and 21, and that the front wall 17 is angularly disposed to the rear wall 18 to provide outboardly converging surfaces to engage therebetween the tension and compression members and the adapter, the front wall having a concave surface 23 contoured to snugly receive the adjacent portion of the tension member. The front face 24 of the head is formed to receive a conventional brake shoe (not shown). The front wall 17 and rear wall 18 are formed with aligned apertures 26 and 27 in registry with an aperture 28 in the adapter to receive a rivet 29 or other type of fastener adapted to be removed to permit removal and replacement of a worn or broken brake head.

In the assembly of the brake beam, the tension and compression members are engaged within a suitable fixture (not shown) with the ends 14 of the tension member engaged within the recesses 13 of their associated adapters 8, the wedge surfaces 31 on the adapters having their medial portions in engagement with the adjacent inboard edges of the slots 7. The ends 14 of the tension member are then welded at 15 to the walls of apertures 32 formed in the adapters in registry with the recesses 13. The adapters 8 are then pressed into seated position on the compression member 2 to engage the adapter flanges 9 against the connecting web 6, while the strut 4 is engaged between the tension and compression members. During movement of the adapters into their respective slots 7, the rearwardly converging wedge surfaces 31 act to place the tension member 3 under tension and the compression member under compression as dictated by good practice in this art. After the adapters 8 are properly seated within the slots 7 in the compression member, the outboard ends of the web 6 are welded at 12 to the adjacent lips 11 of the adapters to provide a strong beam structure suitable for use in railway service and capable of rigidly supporting a pair of brake heads 16. The brake heads are demountably secured upon the ends of the brake beam by means of rivets 29 or other suitable fasteners.

Figures 4, 5 and 6 in the drawings illustrate a modified form of this invention shown as comprising a compression member 36 of channel shape cross section and a tension member 37 of round cross section, the ends of the latter having upset heads 38 to engage the outboard ends of adapters 39. The compression member comprises a pair of spaced flanges 41 and a connecting web 42, the latter being slotted inwardly from its ends at 43 to receive the end portions of the tension member and wedge portions 44 on the adapters. In this form of the invention it will be noted that the flanges 41 project rearwardly from the tension member and that the adapters are seated against the inner side of the web 42 between the flanges.

Each wedge portion 44 projects from a front surface 46 of its respective adapter, and each adapter is formed with an elongated recess 47 to snugly receive the adjacent end portion of the tension member. The outboard end of each adapter is formed with an abutment surface 48 for engagement with the adjacent tension rod head 38, and the inboard end of the adapter is formed channel shape in cross section. As illustrated in Figure 5 the front surface 46 and the top and bottom surfaces 49 and 51 are in snug flush engagement with the inner surfaces of the compression member adjacent thereto.

As illustrated in Figure 4, each wedge portion 44 is formed with a diagonal wedge surface 52 extending rearwardly and inwardly for engagement with the inner wall of its associated slot 43 during assembly of the beam to stress the tension and compression members. During the assembly of the brake beam, the ends of the tension members are engaged within the recesses 47 in the adapters and the latter have their wedge surfaces 52 engaging the walls defining the inner ends of the slots 43. By pressing the adapter surfaces 46 into seated engagement against the inner surface of the web 42, the adapters are also moved apart by the wedge surfaces 52 to stress the tension and compression members and thus provide a tight interlock at the ends of the fabricated beam. If desired, each head 38 on the tension member may be welded at 53 to its adjacent adapter which may also be welded at 54 to the compression member.

Each end of the brake beam is adapted to support a brake head 56 formed with a socket 57 defined by a front wall 58, a rear wall 59 and top and bottom walls 61 and 62 formed to snugly embrace the tension and compression members and the adapter, the head being demountably secured to the beam by means of rivets 63 or other types of fasteners.

Figures 7 to 10 illustrate another modified form of the present invention in which the fabricated brake beam is shown as comprising a compression member 66 of channel cross section, a tension member 67 of round cross section, and a pair of adapters 68. Each adapter is seated against the inner surface of the web 69 by a rivet 71. The outboard end of the adapter is formed with coplanar surfaces 72—72 for flush engagement with rearwardly and outwardly inclined surfaces 73—73 formed on the ends of the side flanges 74—74 of the compression member, while the inner end of the adapter is formed with a cylindrical recess 76 to receive the offset end 77 of the tension member. If desired, the end 77 may be plug welded to the adapter at 78.

Each end of the fabricated beam is adapted to support a brake head 79 having a socket 81 defined by a front wall 82, a rear wall 83, top and bottom walls 84 and 86, and an end wall 87 to snugly enclose the end of the beam. It will be noted that the adapter is snugly engaged within the channel shape compression member and that both are snugly engaged within the socket 81. The brake head is demountably secured to the end of the beam by means of a rivet 88 extending through vertically aligned apertures in the adapter, compression member and head. The front wall 82 of the socket 81 is formed with an inclined abutment shoulder 80 for snug engagement with a complementary surface on the forward side of the adapter 68.

In assembling the brake beam illustrated in Figures 7 to 10, the offset ends 77 of the tension member 67 are inserted into and welded at 78 within the recesses 76 of their respective adapters 68 which are then positioned with their wedge surfaces 72—72 engaging the inclined surfaces 73—73 on the ends of the compression member flanges 74—74. As the adapters are moved into seated engagement against the web 69 they are also moved away from each other by the inclined surfaces 73—73 to place the member 67 under tension and the member 66 under compression. The adapters are then secured to their respective ends of the compression member 66 by means of rivets 71. The brake heads 79 are detachably secured upon the ends of the brake beam by means of rivets 88 which extend through the aligned apertures in the adapters, brake heads and compression member side flanges 74—74. The front faces 89 of the brake heads are formed to receive conventional brake shoes (not shown).

Figures 11 to 14 illustrate another modified form of brake beam comprising a compression member 91 of channel cross section, a tension member 92 of round cross section, and a pair of adapters 93—93 snugly engaged between the side flanges 94—94 of the compression member and formed with pockets 96—96 to receive the offset ends 97—97 of the tension member. The ends of the side flanges 94—94 diverge rearwardly to provide wedge surfaces 98—98 to engage complementary surfaces 99—99 formed on the outboard ends of the adapters. Each offset end 97 is welded at 101 to its respective adapter.

A brake head 102 is adapted to be demountably secured on each end of the brake beam and is shown as comprising a socket 103 defined by a front wall 104, rear wall 106, top and bottom walls 107 and 108, and an end wall 109.

The front wall 104 is formed with a pair of shoulders 111 and 112 to engage the inboard and outboard ends respectively of the adapter to maintain the latter in snug engagement against the web 113 of the compression member. The brake head is demountably secured to the end of the brake beam by means of a rivet 114 extending diagonally through the front and rear walls 104 and 106 and through aligned apertures formed in the adapter and compression member web 113. The face of the brake head is formed to receive a conventional brake shoe (not shown).

In assembling the brake beam thus shown and described, the offset ends 97—97 of the tension member are inserted into the pockets 96—96 of their respective adapters 93 and welded thereto at 101. The adapters are then positioned between the flanges 94—94 of the compression member with their surfaces 99—99 engaged against the wedge surfaces 98—98 diverging rearwardly at the ends of the compression member. As the adapters are urged into abutting engagement with the inner face of the web 113, they are also moved apart by the wedge surfaces 98—98 to stress the tension and compression members. Each end of the beam is then inserted into and snugly engaged within a socket 103 of a brake head 102 which is demountably secured in position by means of a rivet 114 or other type of fastener.

Figure 15 illustrates a brake beam and brake head construction similar to the form illustrated in Figures 11 to 14, except for the means employed for securing the heads on the ends of the beam. In this form of the invention the end wall 116 of the head socket 117 is formed with an aperture 118 and welded at 119 to the outboard end of the adapter 121.

Figures 16, 17, 18 and 19 illustrate another modified form of the invention in which the brake beam is shown as comprising a compression member 126 of channel-shape cross section, a tension member 127 of round cross section, and a pair of adapters 128—128 formed with pockets 129—129 to receive offset ends 131—131 formed on the tension member. The compression member is formed with spaced flanges 132—132 and a connecting web 133, the ends of the flanges having rearwardly diverging wedge surfaces 134 to engage complementary surfaces 136 provided on the adapters.

Each end of the brake beam is provided with a brake head 137 formed with a socket 138 defined by a front wall 139, rear wall 141, top and bottom walls 142 and 143, and an end wall 144. The front wall 139 is disposed substantially parallel to the rear wall at the outboard end of the socket and slopes away from the rear wall adjacent the opening of the socket to provide an abutment surface 146 to engage a complementary surface 147 on the forward side of the adapter. The brake heads are formed with guide lugs 148 for engagement in conventional guide brackets (not shown) and have their front faces formed to receive brake shoes (not shown). Each head is secured to its respective end of the beam by means of a rivet 149 extending through aligned apertures in the head, adapter and flanges 132—132.

In the assembly of the brake beam thus shown and described the offset ends 131—131 are positioned within the pockets of their respective adapters 128—128 and welded thereto at 151, if desired. The adapters are then positioned between the flanges 132—132 of the compression member with their surfaces 136 engaged against the wedge surfaces 134 on the flanges. As the adapters are pressed into position against the inner face of the web 133, they are spread apart by the wedge surfaces 134 to thus stress the tension and compression members. The ends of the brake beam are then inserted into the sockets 138 of their respective brake heads which are secured in position by the rivets 149.

Figures 20, 21, 22 and 23 illustrate another modified form of the invention in which the brake beam comprises a compression member 156, a tension member 157, and a pair of adapters 158. The compression member is preferably of channel cross section embodying a web 159 and a pair of spaced flanges 161—161 arranged to snugly receive the adapters 158. The tension member is preferably formed of round rod stock having its ends offset at 162 for engagement in pockets 163 in the adapters, the ends being welded at 164 to their respective adapters and to the walls of apertures 166 formed in the compression member. Each adapter is provided with an inwardly facing abutment surface 167 to engage the adjacent end of the compression member.

Each end of the brake beam is adapted to support a brake head 168 comprising a socket portion 169 defined by a front wall 171, a rear wall 172, top and bottom walls 173 and 174 and an end wall 176, the end wall being formed with an aperture 177 to receive a boss 178 formed on the adapter. The inboard end of the front wall 171 is trough-shape at 179 to engage the adjacent portion of the tension member. To detachably engage the brake head to the end of the beam, the end of the boss 178 is welded at 181 to the wall defining the aperture 177 in the end wall 176 of the head.

To assemble the structure shown in Figures 20 to 23 the offset ends 162 of the tension member 157 are inserted into the pockets 163 of the adapters 158 and welded thereto at 164. The adapters are then positioned between the flanges 161—161 of the compression member 156 with their abutment surfaces 167 engaging the ends of said member. The brake heads are then mounted upon the ends of the beam and welded at 181 to their respective adapter bosses 178.

In each of the several forms of the invention thus shown and described, it will be noted that the several parts forming the brake beam are tightly interlocked to provide a strong rigid structure suitable for use in railway service, and that the brake heads are adapted to be removed and replaced by new brake heads without disassembling the brake beam. In the assembly of the fabricated brake beam, it will be noted that the tension and compression members are adapted to be stressed to further rigidify the structure.

While this invention has been shown in several forms it is obvious to those skilled in the art that it is not so limited but is susceptible of various changes and modifications without departing from the spirit and scope of the claimed invention.

I claim:

1. In a brake rigging, a brake beam comprising a channel-shape compression member having spaced flanges and a connecting web, a pair of adapters snugly engaged between said flanges at opposite ends of said member and engaged with said web, a tension rod having abutment shoulders facing inwardly from its ends for interlocking engagement with said adapters, a strut interposed between the medial portions of said member and said rod, and means to secure each adapter and the adjacent ends of said member and rod in assembled relation, said member and adapters having complementary wedge surfaces acting during assembly of the beam to move the adapters apart to thus stress the member and rod.

2. In a brake rigging, a brake beam comprising a channel-shape compression member having spaced flanges and a connecting web, a pair of adapters snugly engaged between said flanges at opposite ends of said member and engaged with said web, a tension rod having abutment shoulders facing inwardly from its ends for interlocking engagement with said adapters, a strut interposed between the medial portions of said member and said rod, and means to secure each adapter and the adjacent ends of said member and rod in assembled relation, said adapters having wedge surfaces formed to act against said member to increase the spacing between the adapters during assembly of the beam and thus stress the member and tension rod.

3. In a brake beam, a compression member, a tension member, adapters rigidly connected to opposite ends of the tension member and forming therewith a unit for assembly to said compression member, abutments on the adapters and compression member, at least certain of said abutments being in converging relation with a transverse vertical center plane of said beam, said abutments being selectively and slidingly interengageable during assembly of the unit to the compression member whereby the adapters are urged to separate during said assembly and thereby pre-stress both the tension and compression members.

4. In a brake beam, tension and compression members, adapters rigidly connected to the tension member before assembly to the compression member, abutments on said adapters, and surfaces on said compression member, said surfaces being angularly related to a transverse vertical center plane of said beam and engageable wedge-like with said abutments for relative sliding linear movement during assembly of said members, whereby stresses are induced in said members upon assembly thereof.

5. A brake beam according to claim 4, wherein the abutments are formed at the outboard extremities of said compression member and face outboardly of the beam, and the surfaces are presented adjacent the outboard end of the adapters and face inboardly of the beam.

6. A brake beam according to claim 4, wherein the abutments are formed on the compression member inboardly of the extremities thereof and face outboardly of the beam, and the surfaces are presented on the inboard end of the adapters and face inboardly of the beam.

7. A brake beam according to claim 4, wherein the compression member consists of a channel section having spaced flanges interconnected by a web, and said adapters are received intermediate said flanges and abut an inboard face of said web upon assembly of said members.

8. A brake beam according to claim 4, wherein the compression member consists of a channel section having spaced flanges interconnected by a web, and the adapters are received intermediate said flanges and abut an outboard face of said web upon assembly of said members.

References Cited in the file of this patent

UNITED STATES PATENTS

| | | |
|---|---|---|
| 438,673 | Barnes | Oct. 21, 1890 |
| 687,955 | Fassett | Dec. 3, 1901 |
| 766,362 | Lamont | Aug. 2, 1904 |
| 850,335 | Baker | Apr. 16, 1907 |
| 953,784 | Harrison | Apr. 5, 1910 |
| 956,616 | Williams | May 3, 1910 |
| 1,036,052 | Ziemss | Aug. 20, 1912 |
| 2,490,204 | Busch | Dec. 6, 1949 |